(12) United States Patent
Hosking (10) Patent No.: US 8,135,282 B2
(45) Date of Patent: Mar. 13, 2012

(54) FIBEROPTIC TRANSCEIVER MODULE WITH INTEGRAL STATUS INDICATORS

(75) Inventor: Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 619 days.

(21) Appl. No.: 12/184,093

(22) Filed: Jul. 31, 2008

(65) Prior Publication Data

US 2010/0028014 A1 Feb. 4, 2010

(51) Int. Cl.
*H04B 10/24* (2006.01)
(52) U.S. Cl. .......................................... 398/135; 398/22
(58) Field of Classification Search .................. 398/135, 398/138, 139, 22
See application file for complete search history.

(56) References Cited

U.S. PATENT DOCUMENTS

| | | | | |
|---|---|---|---|---|
| 7,268,688 B2 * | 9/2007 | Juds | ........................... | 340/572.8 |
| 7,507,111 B2 * | 3/2009 | Togami et al. | ................. | 439/484 |
| 7,532,820 B2 * | 5/2009 | Aronson | ....................... | 398/135 |
| 2003/0020986 A1 * | 1/2003 | Pang et al. | ..................... | 359/152 |
| 2003/0053170 A1 * | 3/2003 | Levinson et al. | ............. | 359/152 |
| 2005/0238358 A1 * | 10/2005 | Light | ............................ | 398/135 |
| 2007/0058980 A1 * | 3/2007 | Hidaka | ........................ | 398/138 |
| 2009/0261955 A1 * | 10/2009 | Moore et al. | ................ | 340/10.42 |

* cited by examiner

*Primary Examiner* — Leslie Pascal
(74) *Attorney, Agent, or Firm* — Maschoff Gilmore & Israelsen (57) ABSTRACT

Exemplary embodiments of the invention relate to an optical transceiver module having a status indicator assembly, wherein the status indicator assembly is configured to visually display the operational status of the transceiver transmitter and receiver components. The operational status is accessible while the transceiver operates in conjunction with an external host and may be ascertained in real time without interrupting normal transceiver operation or suspending the transmission of data over optical fibers.

19 Claims, 6 Drawing Sheets

FIBEROPTIC TRANSCEIVER MODULE WITH INTEGRAL STATUS INDICATORS

BACKGROUND OF THE INVENTION

1. The Field of the Invention

The present invention relates generally to optoelectronic communication devices. More specifically, the present invention relates to an optical transceiver module in which the transmission status is visually indicated on the face of the transceiver in real time.

2. The Relevant Technology

Computing and networking technology have transformed our world. As the amount of information communicated over networks has increased, high-speed transmission has become ever more critical. Many high-speed data transmission networks rely on optical transceivers and similar devices for facilitating transmission and reception of digital data embodied in the form of optical signals over optical fibers. Optical networks are thus found in a wide variety of high-speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include an electro-optic transducer driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to as the "controller"), which is the focus here, controls the operation of the laser driver and post amplifier.

In general, the operational status of a particular transceiver module is not ascertainable from a visual inspection. It is therefore difficult for network administrators to determine the status of an individual link and to troubleshoot complex systems.

BRIEF SUMMARY OF THE INVENTION

These and other limitations are overcome by embodiments of the invention which relate to an optical transceiver module in which the status of the module is visually indicated on the face of the transceiver in real time. Embodiments of the invention relate to an optical transceiver module having a status indicator assembly that visually displays the status of the transceiver transmitter and receiver components. The status can include one or more aspects of the transceiver such as transmission status, operational status, diagnostic data, operational parameters, and the like. The status is accessible or visible while the transceiver operates in conjunction with host and may be ascertained in real time without interrupting normal transceiver operation or suspending the transmission of data over optical fibers.

In one example, the transceiver's controller module detects the status of the transmitter component and/or receiver component or other component of the transceiver, and drives a multi-colored light-emitting diode (LED) based on the value detected. Information can be conveyed in terms of color, flash pattern, shape, and the like or any combination thereof. The LED may be mounted anywhere on the printed circuit board of the transceiver. As the status of the transceiver changes, the LED is driven accordingly. The light emitted from the LED is conducted to an opening on the face of the transceiver by a light conductance means such as a light-pipe assembly, thereby allowing an end user to visually ascertain the operational status of the parameters represented. Because space on the face of the transceiver is often limited, a light pipe assembly can conserve the space needed to visually convey status. In addition, the viewing angle of the light can be adjusted during manufacture or during use as needed.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE SELECTED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Figure 1A:
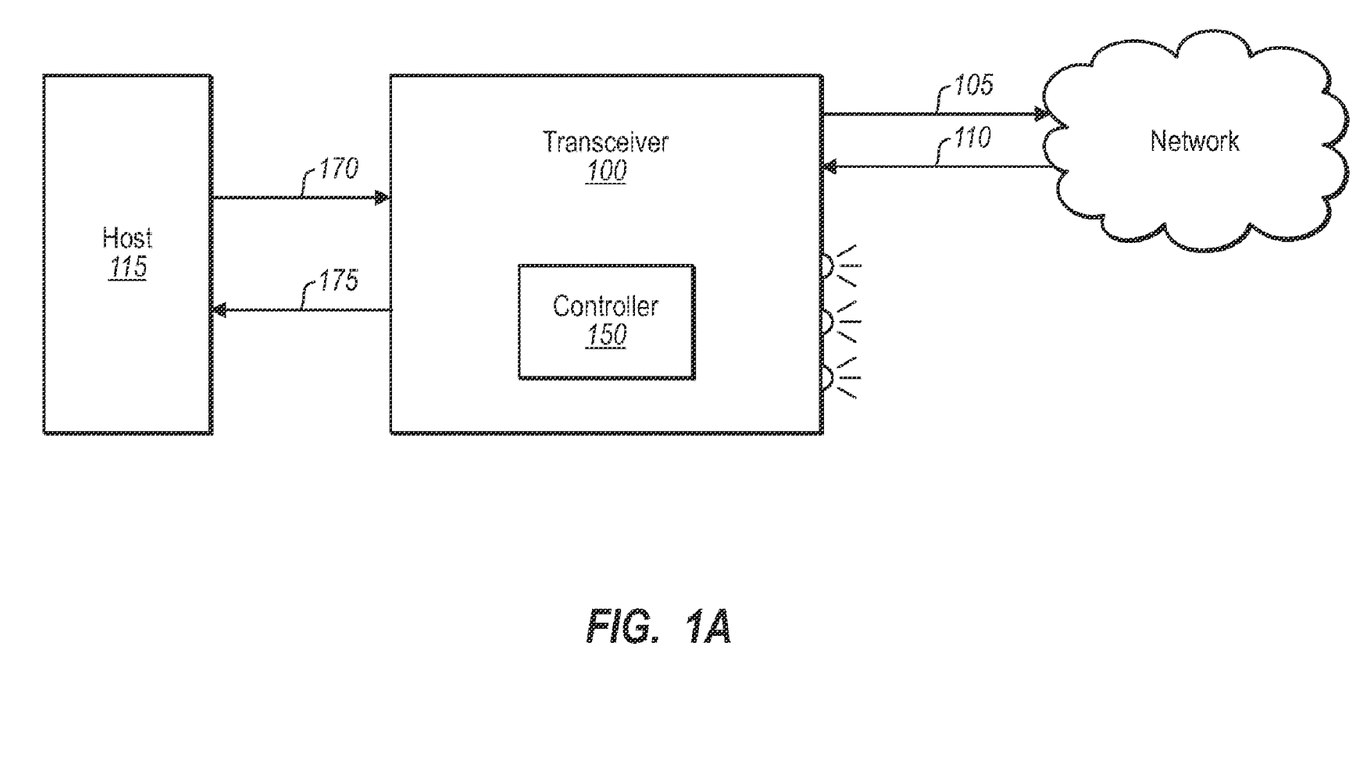
FIG. 1A illustrates a system diagram example of an optical transceiver.

In this example, the transceiver 100 is connected with a host 115. The host 115 may be a network tap, a server computer, a network storage node, a protocol analyzer or any other component or device capable of connecting with a transceiver. Further, the transceiver 100 typically communicates over the network using the fibers 105 and 110. Referring to the system overview illustrated in FIG. 1, exemplary embodiments of the invention relate to an optical transceiver module 100 having a status indicator assembly 155, wherein the status indicator assembly 155 visually displays or conveys information related to the transceiver or to operation of the components included in a transceiver or to the network to which the transceiver is attached. In one embodiment, information related to the operation of the transceiver is accessible from the controller 150 and may include parameters that relate to the status of the transceiver transmitter and the receiver. The status can include, by example only and not limitation, the status of or state of the transmit disable (TxDisable), the transmit fault (TxFault), and/or receive loss of signal (RxLOS). The status indicator assembly 155 functions while transceiver 100 operates in conjunction with a host 115, as represented by arrows 170 and 175, and the status may be perceived in real time without interrupting normal transceiver operation or suspending the transmission of high-speed data over optical fibers 105 and 110.

Figure 1B:
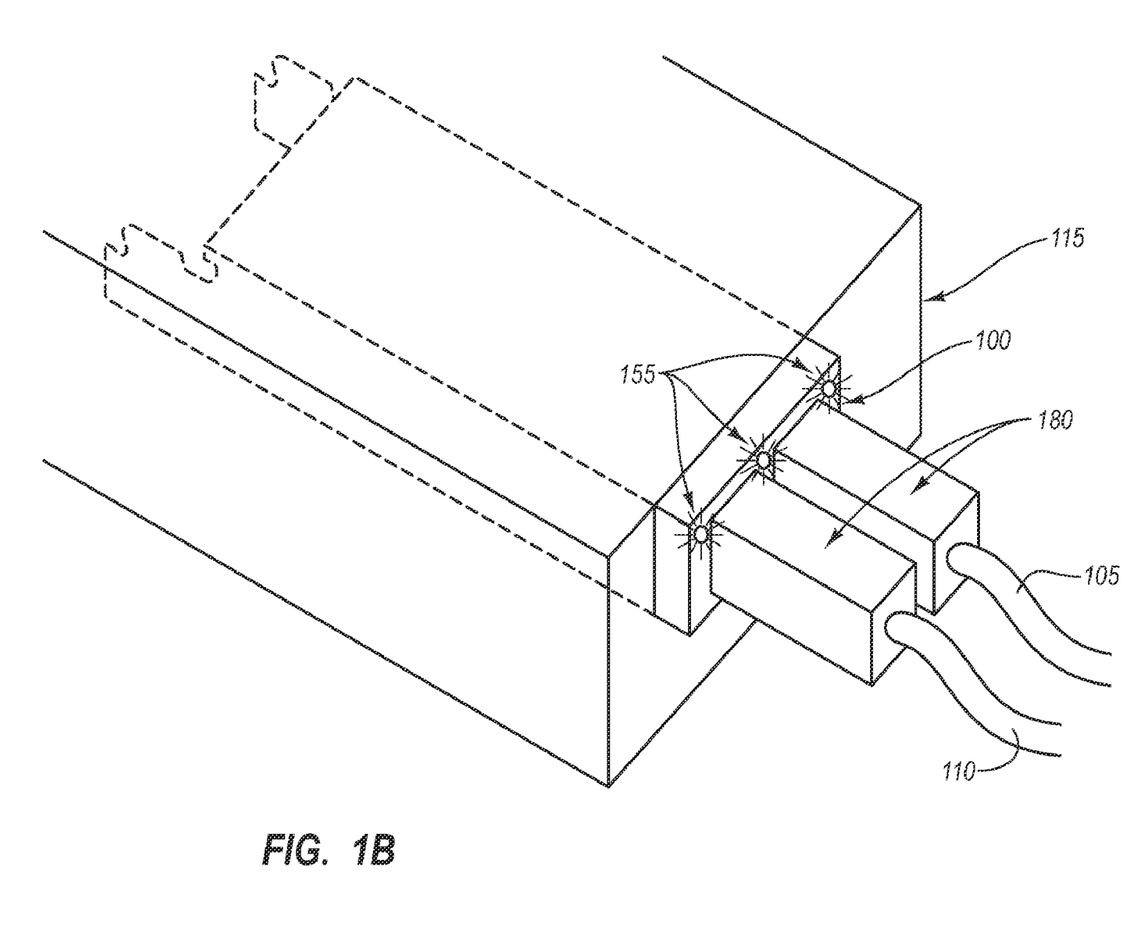
FIG. 1B illustrates an embodiment of the system diagram a transceiver with visible indicators.

FIG. 1B illustrates an embodiment of the system diagram of FIG. 1A. The transceiver 100 is engaged with the host 115 such that it may transfer optical high-speed data over fibers 105 and 110. In the embodiment of FIG. 1B, the status indicator assembly 155 is visually ascertainable while the fiber connectors 180 are plugged into the transceiver 100. As previously stated, the status may include a TxDisable indicator 165A, a TxFault indicator 165B, and a RxLOS indicator 165C which may each be implemented as a multi-color Light-Emitting Diode (LED) and light pipe assembly as described further herein. The particular operational parameters represented herein by the status indicator assembly are by way of example only, and not meant to restrict the scope of the invention. Virtually any conceivable parameter combination may be represented by the status indicator assembly. The light indicator assembly 155 can be used to convey the status of a particular signal (such as TxDisable), the data rate, the power level, and the like. This can be done using colors, flash patterns, by using various light shaping (the indicator 165 may have a particular shape or have multiple parts that can be individually controlled to form a complete or partial shape.

The principles of the present invention are suitable for 1 G, 2 G, 4 G, 8 G, 10 G, 40 G, 100 G and higher bandwidth fiber optic links. Furthermore, the principles of the present invention may be implemented in optical (e.g., laser) transmitter/receivers of any form factor such as XFP, SFP and SFF, without restriction. Embodiments of the invention are suitable for use in other environments including electrical systems, optical systems, etc.

Figure 2:
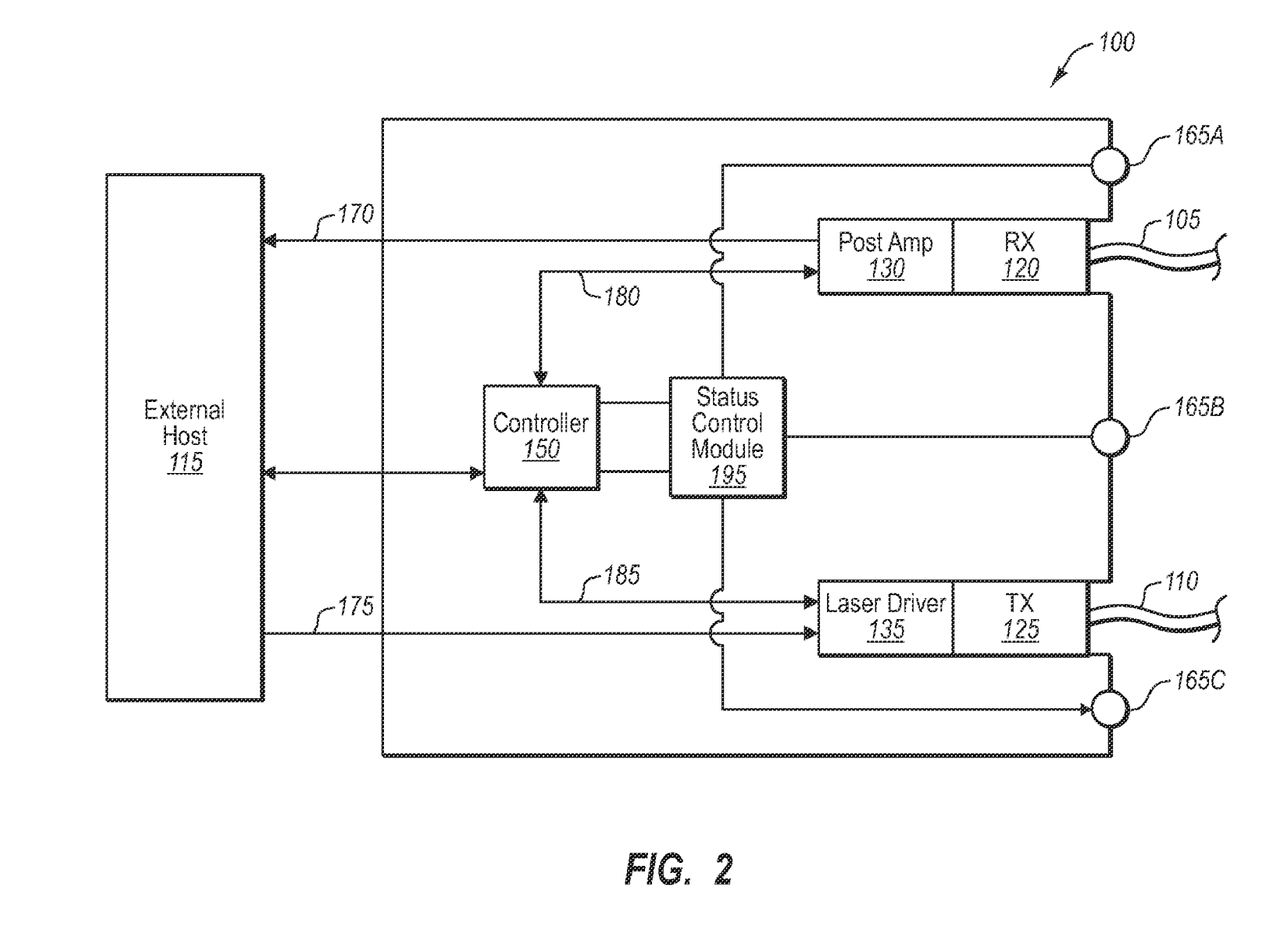
FIG. 2 is a block diagram that illustrates one embodiment of a transceiver module.

As shown in FIG. 2, the optical transceiver 100 receives an optical signal from fiber 105 using receiver 120. The receiver 120 transforms the optical signal into an electrical signal. The receiver 120 provides the resulting electrical signal to a post-amplifier 130. The post-amplifier 130 amplifies the signal and provides the amplified signal to a host system represented by arrow 170. The host 115 may be any computing system capable of communicating with the optical transceiver 100.

The optical transceiver 100 may also receive electrical signals from the host 115 for transmission onto the fiber 110. Specifically, the laser driver 135 receives an electrical signal from host 115 as represented by the arrow 175, and drives the transmitter 125 (e.g., a laser or LED) to emit optical signals onto the fiber 110, where optical signals are representative of the information in the electrical signal provided by the host 115. Accordingly, the transmitter 125 serves as an electro-optic transducer.

The behavior of the receiver 120, the post-amplifier 130, the laser driver 135, and the transmitter 125 may vary dynamically due to a number of factors. For example, temperature changes, power fluctuations, and feedback conditions may each affect the performance of these components. To ensure the quality and integrity of data transmission, various measurement and compensation circuits may be employed to compensate for these changes. The measurement and compensation circuits are managed by the control module of the transceiver, hereinafter "controller" 150. This type of information is example of the status that can be conveyed using the status indicator assembly.

The controller 150 collects and evaluates diagnostic data, such as, but not limited to, temperature, voltage, and low frequency changes (such as receive power) from the post-amplifier 130 (as represented by arrow 180) and/or from the laser driver 135 (as represented by arrow 185). In evaluating operation conditions, the controller 150 receives analog measurements from several sensors, converts the analog signal to a digital value, performs comparison logic with the digital values and predetermined setup data, and, finally, stores the digital operating condition values and the results of the comparison logic (collectively "digital diagnostic data") in the controller's 150 non-volatile memory. This allows the controller 150 to optimize the dynamically varying performance, and additionally detect when there is a loss of signal. Specifically, the controller 150 may counteract these changes by adjusting settings on the post-amplifier 130 and/or the laser driver 135 as also represented by the arrows 180 and 185. In addition to evaluating operation conditions, the controller 150 can also simply provide the status of a signal. For example, some digital signals are either asserted or not and can be conveyed accordingly.

The controller 150 is accessed by the status control module 195 or provides information to the status control module 195, which is configured to manage the operation of the status indicator assembly 155. Based on parameters values from the controller 150, the status control module 195, in one embodiment, changes the color of the LEDs representing the TxDisable indicator 165A, TxFault indicator 165B, and RxLOS indicator 165C. Several color combinations may be used to indicate different operational states of the transceiver. Bicolor LEDs contain 2 dice of different colors connected back to back, and can produce any of 3 colors. Current flow in one direction produces one color, current in the other direction produces the other color, and bidirectional current produces both colors mixed together. Tricolor LEDs contain 2 dice of different colors with a 3 wire connection, available in common anode or common cathode configurations. The most common form of both the bicolor and tricolor LEDs is red/green, producing orange when both colors are powered. RGB LEDs contain red, green and blue emitters, generally using a 4 wire connection with one common (anode or cathode). This allows the status to be conveyed using colors, color patterns, flashing patterns, and the like.

Figure 3A:
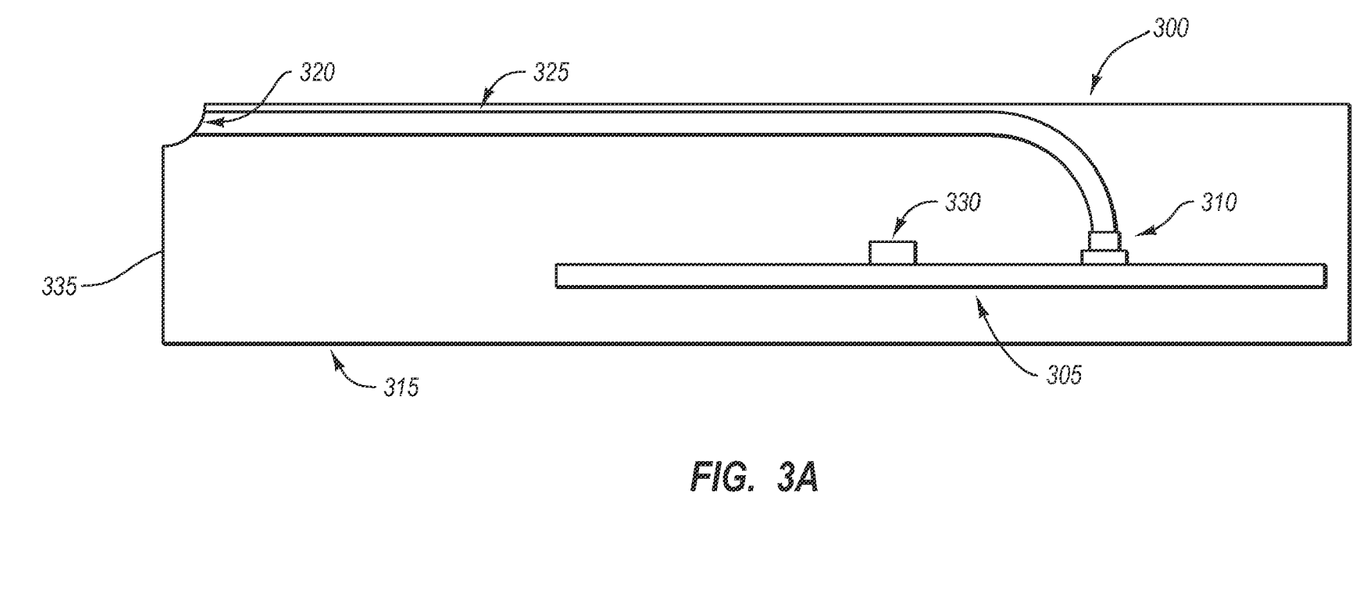
FIG. 3A illustrates a side view of an example of an optical transceiver that may implement features of the present invention.
Figure 3B:
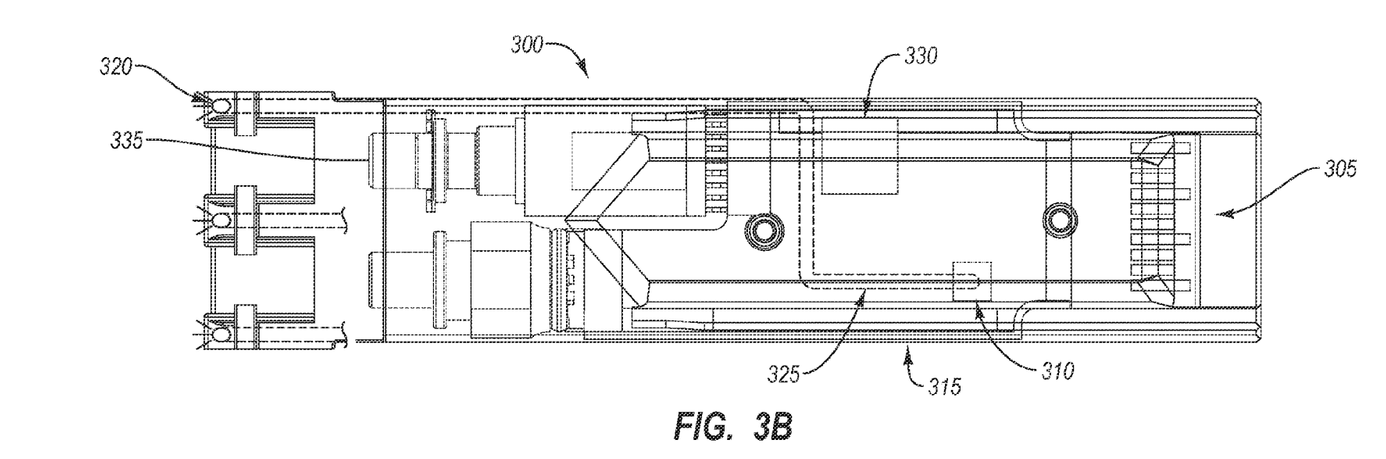
FIG. 3B illustrates a top view of an example of an optical transceiver that may implement features of the present invention.

Referring to FIGS. 3A and 3B, exemplary embodiments of the invention relate to an optical transceiver module 300 having a visual status indicator, wherein the status indicator are implemented as an LED 310. Embodiments of the invention involve mounting the LED 310 the printed circuit board 305 of transceiver 300 such that it is electrically connected to the controller 330. In this example, the status control module in FIG. 2A is typically part of the controller 330 and may be implemented as firmware. Of course, the status control module could be implemented separately from the controller. The controller 330 (or, more specifically, the status control module) is configured to manage the color of light that the LED 310 emits based on the particular parameter value that the LED 310 represents. In this embodiment, light from the LED 310 is conducted to the face 335 of the transceiver module 300 by means of a light pipe assembly 325. The light pipe assembly 325 extends through or into the opening 320 in the transceiver housing 315 and makes the light from the LED 310 on the printed circuit board 305 visible from outside the transceiver housing 315. As the controller 330 detects a change in value of the parameter represented by the LED 310, the controller 310 drives the LED 310 to emit a different color representing the new value of the parameter.

Figure 3C:
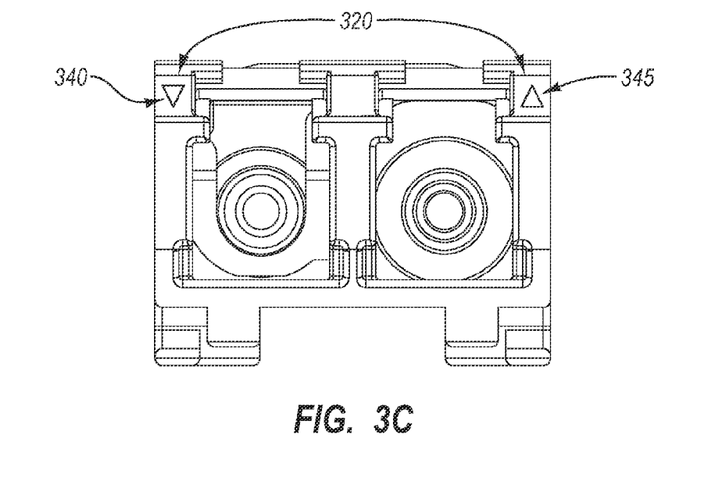
FIG. 3C illustrates the front view of an example of an optical transceiver that may implement features of the present invention.

The opening 320 may include a window as part of the light indicator assembly. The window may be flat and plastic such that the light is emitted through the window. The window may also have a lens shape or include a lens (such as a ball lens) that protrudes from a surface of the face of the transceiver. When the window is illuminated, it can be easily viewed from multiple viewing angles. Further, the spherical shape of the window or the aspherical shape of the window may also be used to aid the visibility of the emitted light. Of course, the window may be shaped in other configurations such as illustrated in FIG. 3C.

While the particular embodiment of FIGS. 3A and 3B employs a light pipe assembly to the conduct light from the LED to the face 335 of the transceiver, the light from the LED may be conducted by means of fibers, molded plastic light pipes, or any reflective, refractive, or conductive channel. Using a light conduction means as opposed to mounting LEDs directly on the visible surface of the transceiver (such as the face 335) allows the LED to be mounted anywhere on the printed circuit board of the transceiver and eliminates mounting and wiring issues that would be encountered in directly mounting the LEDs on the limited surface area that is visible. Additionally, by conducting light from the printed circuit board, the viewing position and viewing angle of the indicator is more easily achieved. Finally, indicator forms or shapes, such as illuminating the "Input" and "Output" fiber connector arrows can be created. As demonstrated in FIG. 3C, the openings 320 in the transceiver housing 315 may be shaped to indicate the direction of optical transmission represented. In the exemplary embodiment, the transmit indicator 340 is represented as an outgoing arrow and the receive indicator 345 is represented as an incoming arrow.

In another embodiment, a single LED can be used for each indicator on the face of the transceiver. In this example, passive optics, including a filter may be used to direct specific colors to specific indicators. Thus, a tri-color LED could direct a first color to a first indicator, a second color to a second indicator, and the like. Alternatively, each indicator may be capable of displaying multiple colors. Further, more than one LED may be mounted to the printed circuit board as previously described such that each indicator can be separately controlled.

Figure 4A:
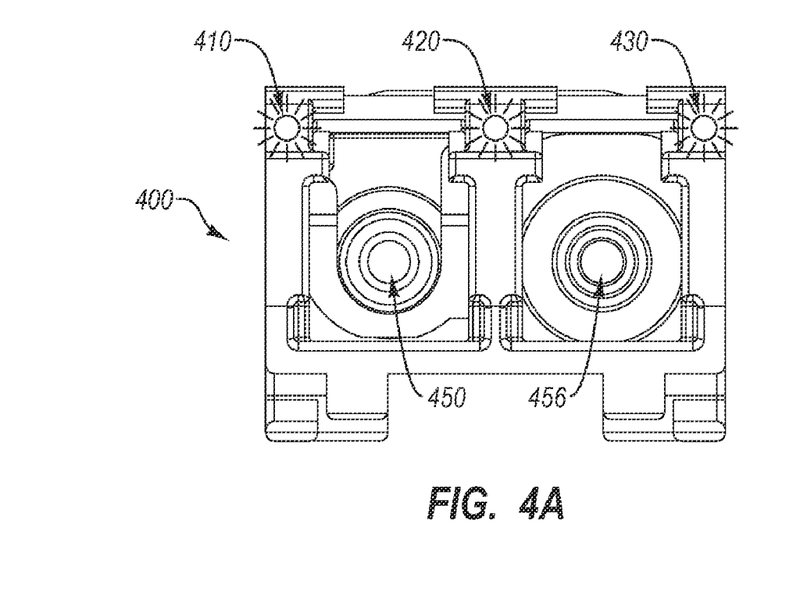
FIG. 4A illustrates the front view of an example embodiment of an optical transceiver that may implement features of the present invention.
Figure 4B:
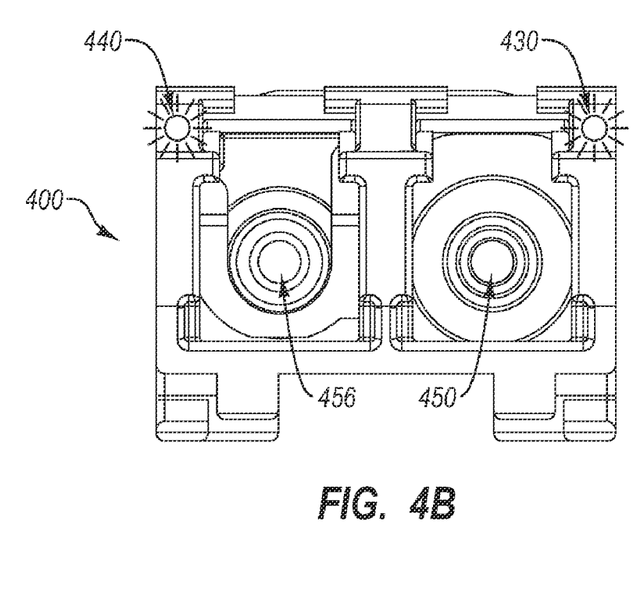
FIG. 4B illustrates the front view of an example of an alternative embodiment of an optical transceiver that may implement features of the present invention.

As shown in FIGS. 4A and 4B, the number of indicators on the face of the transceiver 400 may vary. In the three indicator configuration of FIG. 4A, the TxDisable indicator 410, TxFault indicator 420, and RxLOS indicator 430 are each illuminated by a multi-color LED, and may represent different operational states according to Table 1.

TABLE 1

| SIGNAL | INDICATOR COLOR | INDICATION |
| --- | --- | --- |
| TxDisable | Green | Transmitter is enabled by host. |
| | Yellow or Red | Transmitter is disabled by host. |
| TxFault | Green | No transmitter error detected. |
| | Yellow | Transmitter warning condition detected. Outbound optical signal quality may be degraded. |
| | Red | Fault detected. Transmitter is not operational. |
| RxLOS | Green | Received optical signal strength is good. |
| | Yellow | Received optical signal strength is marginal. |
| | Red | No incoming optical signal. |

In the two indicator configuration of FIG. 4B, the TxDisable/TxFault indicator 440, and RxLOS indicator 430 are each illuminated by a multi-color LED, and may represent operational states according to Table 2. Notably, in both configurations, the status indicators are visually ascertainable when fiber connector cables are plugged into the transceiver receptacles 450.

TABLE 2

| SIGNAL | INDICATOR COLOR | INDICATION |
| --- | --- | --- |
| TxDisable/ TxFault | Green | Transmitter is enabled and no transmitter error detected. The outbound optical link is operational. |
| | Yellow | Transmitter is disabled by host. |
| | Red | Transmitter fault detected. The outbound optical link is not operational. |
| RxLOS | Green | Received optical signal strength is good. |
| | Yellow | Received optical signal strength is marginal. |
| | Red | No incoming optical signal. |

In addition, each indicator may flash as well. Thus, a flashing red, yellow, or green may be used to indicate other status. Finally, two or more indicators can be used to convey additional information. As a result, a particular sequence of colors may have additional meaning or a sequence of flashing colors to distinguish the sequence from individual indicators that are constantly illuminated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transceiver module comprising:
   a housing;
   a printed circuit board at least partially enclosed in the housing;
   a transmitter optical subassembly enclosed in the housing and communicatively coupled to the printed circuit board for transmitting high-speed data;
   a receiver optical subassembly enclosed in the housing and communicatively coupled to the printed circuit board for receiving high-speed data;
   a controller enclosed in the housing that monitors the transmission and reception of the high-speed data over the transmitter optical subassembly and the receiver optical subassembly, wherein the controller collects status describing the transmission and reception of the high speed data and wherein the controller is configured to communicate transmission information to a user via at least one status indicator; and
   a status indicator assembly enclosed in the housing and communicatively coupled to the controller, wherein the controller conveys the status over the status indicator assembly such that the status is visible from outside the housing and capable of being understood by a human eye, and wherein the status indicator assembly includes an aperture configured to interface with the status indicator assembly, and wherein the aperture having formed ends in the shape of an arrow representing the existence and direction of data transmission.

2. The transceiver module of claim 1, wherein the status indicator assembly comprises at least one multi-colored light-emitting diode, wherein the multi-colored light-emitting diode is configured to emit a plurality of colors each representing an operational state.

3. The transceiver module of claim 2, wherein the status indicator assembly includes only a single multi-colored light-emitting diode, wherein the single multi-colored light-emitting diode is conditioned to emit different colors such that the light emitted from the single multi-colored light-emitting diode is visible from outside the housing to display a plurality of status indications.

4. The transceiver module of claim 3, wherein the single multi-colored light-emitting diode contains 2 dice of different colors connected back to back where current flow in one direction produces one color, current flow in the other direction produces another color, and bidirectional current produces both colors mixed together.

5. The transceiver module of claim 1, wherein the status indicator assembly further comprises a means for conducting light emitted from the multi-colored light-emitting diode to the aperture such that the light emitted from the multi-colored light-emitting diode is visible from outside the housing.

6. The transceiver module of claim 5, wherein the means for conducting light emitted from the multi-colored light emitted diode to the aperture comprises a light pipe assembly.

7. The transceiver module of claim 5, wherein the means for conducting light emitted from the multi-colored light-emitting diode to the aperture comprises an optical fiber having formed ends.

8. The transceiver module of claim 1, wherein the status indicator assembly is capable of representing at least three operational parameters.

9. The transceiver module of claim 8, wherein the status indicator assembly conveys a status of TxDisable, TxFault, and RxLOS.

10. The transceiver module of claim 1, wherein the status indicator assembly is capable of representing at least two operational parameters.

11. The transceiver module of claim 10, wherein the status indicator assembly conveys a status of TxDisable/TxFault and RxLOS.

12. A transceiver module comprising:
    a housing having a status indicator window mounted on a face of a transceiver;
    a transmitter optical subassembly enclosed in the housing and communicatively coupled to a controller for transmitting high-speed data;
    a receiver optical subassembly enclosed in the housing and communicatively coupled to the controller for receiving high-speed data;
    a status indicator assembly enclosed in the housing and communicatively coupled to the controller, wherein the status indicator assembly comprises at least one light-emitting diode configured to represent an operational status of a transceiver component, wherein the operational status is visually conveyed through the status indicator window, and wherein the at least one light-emitting diode communicates the operational status of the transceiver including at least two of a TxDisable, a TxFault, and a RxLOS.

13. The transceiver module of claim 12, wherein the status indication window is visually ascertainable when optical cables are connected to the transceiver module.

14. The transceiver module of 12, wherein the at least one light emitting diode is mounted to the printed circuit board such that each light-emitting diode can be separately controlled.

15. The transceiver module of claim 12, where the at least one light-emitting diode is a multi-colored light-emitting diode configured to emit a plurality of colors each representing a value of the operational status of a transceiver component.

16. The transceiver module of claim 12, wherein the status indication window is in the shape of an arrow representing a direction of data transmission.

17. The transceiver module of claim 12, wherein the status indicator assembly further comprises a means for conducting light emitted from the light-emitting diode to the status indication window such that the light emitted from the multi-colored light-emitting diode is humanly visible from outside the housing.

18. The transceiver module of claim 17, wherein the means for conducting light emitted from the light-emitting diode to the status indication window is a light-pipe assembly.

19. The transceiver module of claim 17, wherein the means for conducting light emitted from the light-emitting diode to the status indication window is an optical fiber having formed ends.

* * * * *